US008544043B2

(12) United States Patent
Parekh et al.

(10) Patent No.: US 8,544,043 B2
(45) Date of Patent: Sep. 24, 2013

(54) METHODS AND APPARATUS FOR PROVIDING CONTENT INFORMATION TO CONTENT SERVERS

(75) Inventors: Nileshkumar J. Parekh, San Diego, CA (US); Ravinder Paul (Rob) Chandhok, Poway, CA (US); Michael O'Keefe, Romona, CA (US); An Mei Chen, San Diego, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 747 days.

(21) Appl. No.: 11/186,161

(22) Filed: Jul. 19, 2005

(65) Prior Publication Data

US 2007/0044121 A1    Feb. 22, 2007

Related U.S. Application Data

(60) Provisional application No. 60/590,127, filed on Jul. 21, 2004.

(51) Int. Cl.
    *H04N 5/445* (2011.01)
(52) U.S. Cl.
    USPC .......... 725/50; 725/38; 725/39; 725/45; 725/46
(58) Field of Classification Search
    USPC ...................... 725/39, 50, 48, 110
    See application file for complete search history.

(56) References Cited

U.S. PATENT DOCUMENTS

| | | | |
|---|---|---|---|
| 5,408,526 A | | 4/1995 | McFarland et al. |
| 5,552,833 A | * | 9/1996 | Henmi et al. ............. 348/460 |
| 5,600,573 A | * | 2/1997 | Hendricks et al. ......... 725/109 |
| 5,630,119 A | | 5/1997 | Aristides et al. ............. 395/601 |
| 5,635,918 A | | 6/1997 | Tett |
| 5,657,072 A | * | 8/1997 | Aristides et al. ............. 725/46 |
| 5,666,645 A | * | 9/1997 | Thomas et al. ............. 725/47 |
| 5,742,905 A | | 4/1998 | Pepe et al. |

(Continued)

FOREIGN PATENT DOCUMENTS

| | | |
|---|---|---|
| EP | 1341366 A2 | 4/1996 |
| EP | 1294165 A1 | 3/2003 |

(Continued)

OTHER PUBLICATIONS

International Search Report—PCT/US2005/026268, International Search Authority—European Patent Office—Nov. 29, 2005.

(Continued)

*Primary Examiner* — Vivek Srivastava
*Assistant Examiner* — Anthony Bantamoi
(74) *Attorney, Agent, or Firm* — The Marbury Law Group, PLLC

(57) ABSTRACT

Methods and apparatus for maintaining program-guide records comprises the steps of requesting a program-guide index, receiving the program-guide index, and determining whether there exists any new program-guide record based on the received program-guide index. The method further comprises requesting a new program-guide record and receiving the program-guide record. In one aspect, a method for maintaining program-guide records comprises the steps of receiving a program-guide update indication, and determining any new program-guide record based on the received program-guide update indication. The method further comprises requesting an updated program-guide record, receiving the updated program-guide record, and updating the program-guide records.

105 Claims, 14 Drawing Sheets

(56) References Cited

U.S. PATENT DOCUMENTS

| | | | |
|---|---|---|---|
| 5,852,717 A * | 12/1998 | Bhide et al. | 709/203 |
| 5,878,351 A | 3/1999 | Alanara et al. | |
| 6,035,304 A | 3/2000 | Machida et al. | |
| 6,075,526 A | 6/2000 | Rothmuller | |
| 6,091,961 A | 7/2000 | Khalil | |
| 6,223,210 B1 | 4/2001 | Hickey | |
| 6,536,041 B1 * | 3/2003 | Knudson et al. | 725/39 |
| 6,580,916 B1 | 6/2003 | Weisshaar et al. | |
| 6,625,460 B1 | 9/2003 | Patil | |
| 6,728,530 B1 | 4/2004 | Heinonen et al. | |
| 6,961,560 B2 | 11/2005 | Hermann et al. | |
| 6,963,725 B2 | 11/2005 | Kato | |
| 6,965,770 B2 | 11/2005 | Walsh et al. | |
| 6,996,393 B2 | 2/2006 | Pyhalammi et al. | |
| 7,073,244 B2 | 7/2006 | Olari et al. | |
| 7,076,244 B2 | 7/2006 | Lazaridis et al. | |
| 7,168,078 B2 | 1/2007 | Bar et al. | |
| 7,248,860 B2 | 7/2007 | Kamdar et al. | |
| 7,302,057 B2 | 11/2007 | Rotholtz et al. | |
| 7,392,039 B2 | 6/2008 | Souissi et al. | |
| 7,409,421 B2 | 8/2008 | Sugihara | |
| 7,411,868 B2 | 8/2008 | Kohmoto | |
| 7,415,281 B2 | 8/2008 | Ahn | |
| 7,472,075 B2 | 12/2008 | Odinak et al. | |
| 7,536,447 B1 | 5/2009 | Oneil | |
| 7,546,383 B2 | 6/2009 | Smith | |
| 7,801,480 B2 | 9/2010 | Becker | |
| 7,912,457 B2 | 3/2011 | Chandhok et al. | |
| 7,917,128 B2 | 3/2011 | Niekerk et al. | |
| 7,979,055 B2 | 7/2011 | Watanabe et al. | |
| 8,032,914 B2 | 10/2011 | Rodriguez | |
| 2002/0035607 A1 | 3/2002 | Checkoway et al. | |
| 2002/0068558 A1 | 6/2002 | Janik | |
| 2002/0090932 A1 | 7/2002 | Bhatia et al. | |
| 2002/0135698 A1 | 9/2002 | Shinohara | |
| 2002/0143976 A1 * | 10/2002 | Barker et al. | 709/231 |
| 2002/0162106 A1 | 10/2002 | Pickover et al. | |
| 2003/0009770 A1 | 1/2003 | Tantawy et al. | |
| 2003/0018794 A1 | 1/2003 | Zhang et al. | |
| 2003/0028876 A1 * | 2/2003 | Eguchi et al. | 725/38 |
| 2003/0032409 A1 | 2/2003 | Hutcheson et al. | |
| 2003/0084108 A1 | 5/2003 | Syed | |
| 2003/0093530 A1 | 5/2003 | Syed | |
| 2004/0045029 A1 | 3/2004 | Matsuura | |
| 2004/0083287 A1 | 4/2004 | Gao et al. | |
| 2004/0133467 A1 | 7/2004 | Siler | |
| 2004/0230664 A1 | 11/2004 | Bowers et al. | |
| 2005/0022237 A1 * | 1/2005 | Nomura | 725/39 |
| 2005/0254440 A1 | 11/2005 | Sorrell | |
| 2006/0159069 A1 | 7/2006 | Parekh et al. | |
| 2006/0174271 A1 * | 8/2006 | Chen et al. | 725/39 |
| 2007/0214482 A1 * | 9/2007 | Nguyen | 725/91 |
| 2010/0146559 A1 | 6/2010 | Lee et al. | |
| 2010/0279681 A1 | 11/2010 | Ahmad et al. | |
| 2011/0202659 A1 | 8/2011 | Chandhok et al. | |

FOREIGN PATENT DOCUMENTS

| | | |
|---|---|---|
| EP | 1341366 A2 * | 9/2003 |
| JP | 56110372 | 9/1981 |
| JP | 445632 | 2/1992 |
| JP | 2000115165 A | 4/2000 |
| JP | 2001211431 A | 8/2001 |
| JP | 2001275055 A | 10/2001 |
| JP | 2002007258 A | 1/2002 |
| JP | 2002101127 A | 4/2002 |
| JP | 2002112155 A | 4/2002 |
| JP | 2002141941 A | 5/2002 |
| JP | 2002247091 A | 8/2002 |
| JP | 2002259381 A | 9/2002 |
| JP | 2002271383 A | 9/2002 |
| JP | 2002305773 | 10/2002 |
| JP | 2002314546 | 10/2002 |
| JP | 2003108457 | 4/2003 |
| JP | 2003143224 A | 5/2003 |
| JP | 2003152785 A | 5/2003 |
| JP | 2003169087 A | 6/2003 |
| JP | 2003179919 A | 6/2003 |
| JP | 2003216869 A | 7/2003 |
| JP | 2003283799 A | 10/2003 |
| JP | 2004096654 A | 3/2004 |
| JP | 2004145520 A | 5/2004 |
| JP | 2004274700 A | 9/2004 |
| JP | 2004320489 A | 11/2004 |
| KR | 2003-0022838 | 3/2003 |
| WO | 9822886 | 5/1998 |
| WO | WO00/56067 | 9/2000 |
| WO | 0064177 | 10/2000 |
| WO | 0069101 | 11/2000 |
| WO | 0074322 | 12/2000 |
| WO | WO0115444 | 3/2001 |
| WO | WO02052811 A1 | 7/2002 |
| WO | 02084454 | 10/2002 |
| WO | 03019861 | 3/2003 |
| WO | WO03/071803 A1 | 8/2003 |
| WO | WO2005107216 | 11/2005 |

OTHER PUBLICATIONS

Written Opinion—PCT/US2005/026268, International Search Authority—European Patent Office—Nov. 29, 2005.

Written Opinion of the International Preliminary Examining Authority—PCT/US2005/026268, International Preliminary Examination Authority—Alexandria, Virginia, US—May 21, 2007.

International Preliminary Report on Patentability—PCT/US2005/026268, International Preliminary Examination Authority—Alexandria, Virginia, US—Sep. 14, 2007.

3GPP TS 23.246 v6.2.0 (Mar. 2004), "3rd Generation Partnership Project; Technical Specification Group Services and System Aspects; Multimedia Broadcast/Multicast Service (MBMS); Architecture and functional description (Release 6)".

* cited by examiner

METHODS AND APPARATUS FOR PROVIDING CONTENT INFORMATION TO CONTENT SERVERS

CLAIM OF PRIORITY UNDER 35 U.S.C. §119

The present Application for Patent claims priority to Provisional Application No. 60/590,127 entitled "Method and Apparatus for Publishing non-real-time Multimedia content to a Multimedia Content Distribution System Consisting of a Content Distribution network and a Wireless Radio Network such as CDMA2000" filed Jul. 21, 2004, and assigned to the assignee hereof and hereby expressly incorporated by reference herein.

BACKGROUND

1. Field

The disclosed embodiments of the invention relate generally to the operation of content distribution systems, and more particularly, to methods and apparatus for providing content information to content servers in a data network.

2. Background

In media-distribution systems, a program guide (PG), which describes a delivery schedule of available content or services, may be provided to content servers (CSs) in a distribution network. For example, a content provider that operates on the distribution network may provide the PG to CSs in communication with the network. The CSs receiving the PG operate to display information in the PG to device users who then may select content or services to be received by a device. For example, a device user may select and/or subscribe to receive content or services that include multimedia content, clips, programs, scripts, data, customer services, or any other type of content or service.

Therefore, what is needed is a system that operates to provide content information to content servers in a distribution network, so that the content servers may update their locally stored copies of the content in an efficient manner. The system should also operate to minimize the amount of PG information that is transmitted to allow content servers to update their locally stored copies of the content, while avoiding wasteful transmission and/or re-transmissions of whole content information.

SUMMARY

In one or more embodiments, a content-delivery system, comprising methods and apparatus, is provided that operates to provide content information to content servers in a data network.

In one aspect, a method for maintaining program-guide records comprises the steps of requesting a program-guide index, receiving the program-guide index, and determining whether there exists any new program-guide record based on the received program-guide index. The method further comprises requesting a new program-guide record and receiving the program-guide record.

In one aspect, a method for maintaining program-guide records comprises the steps of receiving a program guide update indication, and determining any new program-guide record based on the received program guide update indication. The method further comprises requesting an updated program-guide record, receiving the updated program-guide record, and consequently updating the program-guide records.

In one aspect, a method for maintaining content records comprises the steps of requesting a content index, receiving the content index, and determining whether there exists any new content record based on the received content index. The method further comprises requesting the new content record and receiving the new content record.

In one aspect, a method for providing program-guide records by a content provider to a content server comprises the steps of sending a program guide update indication to a content server, receiving a request for an updated program-guide record from the content server, and sending the updated program-guide record to the content server.

In one aspect, a method for providing content records by a content provider to a content server comprises the steps of sending a content indication to the content server, receiving a request for a content record, and sending the requested content record.

In one aspect, apparatus is provided for providing and/or updating a program guide and/or content that comprises processing logics that operate to perform the above processes.

In one aspect, a computer-readable media is provided that comprises instructions, which when executed by a processor, operate to perform the above processes.

Other aspects of the embodiments will become apparent after review of the hereinafter set forth Brief Description of the Drawings, Detailed Description, and the Claims.

BRIEF DESCRIPTION OF THE DRAWINGS

The foregoing aspects of the embodiments described herein will become more readily apparent by reference to the following detailed description when taken in conjunction with the accompanying drawings wherein.

DETAILED DESCRIPTION

The following detailed description describes one or more embodiments of a content delivery system. The system is especially well suited for use in wireless network environments, but may be used in any type of network environment, including but not limited to, communication networks, public networks, such as the Internet, private networks, such as virtual private networks (VPN), local area networks, wide area networks, long haul networks, or any other type of data or communication network.

In one or more embodiments, the content delivery system operates to provide the current program guide (PG) records to content servers (CSs) on a distribution network. For example, the PG record is maintained at a content provider and contains a list of scheduled content and/or services that are available for the CSs to receive. A copy of the PG records may also be maintained at authorized CSs on the distribution network. In one embodiment, when the PG record at the content provider (CP) is updated, an indication of the updated PG records may be transmitted to CSs on the distribution network. When a CS receives the indication of the updated PG records, CS determines whether or not to retrieve all or selected portions of the PG records to update its local copy of PG records. In one embodiment, a CS requests for PG index from a CP on a regular basis, scheduled polling or based on a predetermined frequency, to determine whether or not any changes has occurred to the PG records at the CP. If the received PG index indicated any update to the PG records, the CS may retrieve all or selected portions of the PG records to update its local copy of PG records. Thus, each CS is able to maintain a current copy of the PG record, thereby allowing the end users to subscribe to current content or services that may be available. As a result, the update notification scheme avoids the burden and inefficiencies associated with re-transmitting the entire PG records and/or program contents to all CSs every time the PG records and/or the content or service change.

Figure 1:
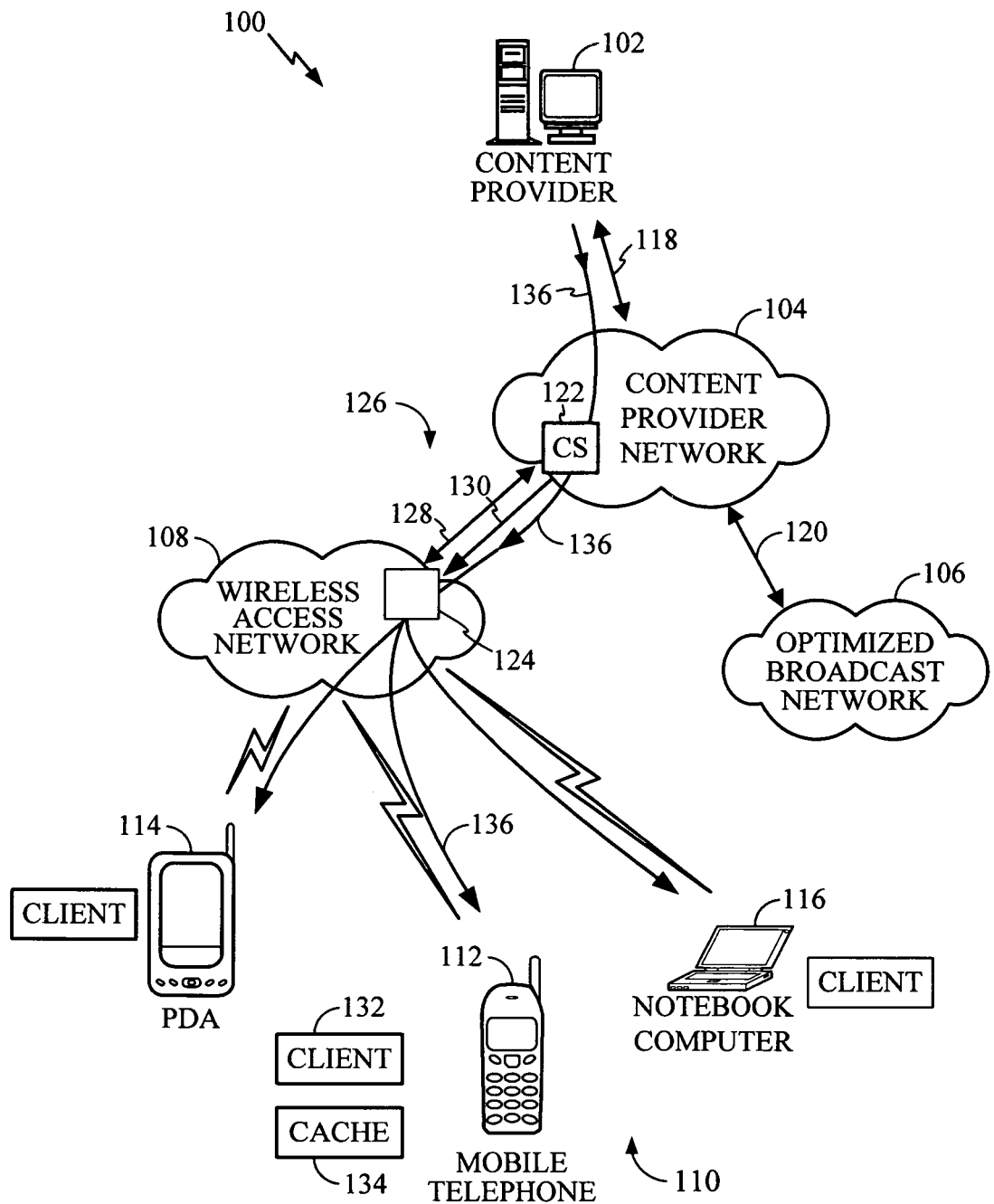
FIG. 1 shows a network that comprises one embodiment of a content delivery system.

FIG. 1 shows one embodiment of a communication network 100 that comprises one embodiment of a transport system that operates to create and transport multimedia content flows across data networks. For example, the transport system is suitable for use in transporting content clips from a content provider network to a wireless access network for broadcast distribution.

The network 100 comprises a content provider (CP) 102, a content provider network 104, an optimized broadcast network 106, and a wireless access network 108. The network 100 also includes devices 110 that comprise a mobile telephone 112, a personal digital assistance (PDA) 114, and a notebook computer 116. The devices 110 illustrate just some of the devices that are suitable for use in one or more embodiments of the transport system. It should be noted that although three devices are shown in FIG. 1, virtually any number of devices, or types of devices are suitable for use in the transport system.

The content provider 102 operates to provide content for distribution to users in the network 100. The content comprises video, audio, multimedia content, clips, real-time and non real-time content, scripts, programs, data or any other type of suitable content. The content provider 102 provides the content to the content provider network 104 for distribution. For example the content provider 102 communicates with the content provider network 104 via the communication link 118, which comprises any suitable type of wired and/or wireless communication link.

The content provider network 104 comprises any combination of wired and wireless networks that operate to distribute content for delivery to users. The content provider network 104 communicates with the optimized broadcast network 106 via the link 120. The link 120 comprises any suitable type of wired and/or wireless communication link. The optimized broadcast network 106 comprises any combination of wired and wireless networks that are designed to broadcast high quality content. For example, the optimized broadcast network 106 may be a specialized proprietary network that has been optimized to deliver high quality content to selected devices over a plurality of optimized communication channels.

In one or more embodiments, the transport system operates to deliver content from the content provider 102 for distribution to a content server (CS) 122 at the content provider network 104 that operates to communicate with a broadcast base station (BBS) 124 at the wireless access network. The CS 122 and the BBS 124 communicate using one or more embodiments of a transport interface 126 that allows the content provider network 104 to deliver content in the form of content flows to the wireless access network 108 for broadcast/multicast to the devices 110. The transport interface 126 comprises a control interface 128 and a bearer channel 130. The control interface 128 operates to allow the CS 122 to add, change, cancel, or otherwise modify contents flows that flow from the content provider network 104 to the wireless access network 108. The bearer channel 130 operates to transport the content flows from the content provider network 104 to the wireless access network 108.

In one embodiment, the CS 122 uses the transport interface 126 to schedule a content flow to be transmitted to the BBS 124 for broadcast/multicast over the wireless access network 108. For example, the content flow may comprise a non real-time content clip that was provided by the content provider 102 for distribution using the content provider network 104. In one embodiment, the CS 122 operates to negotiate with the BBS 124 to determine one or more parameters associated with the content clip. Once the BBS 124 receives the content clip, it broadcasts/multicasts the content clip over the wireless access network 108 for reception by one or more of the devices 110. Any of the devices 110 may be authorized to receive the content clip and cache it for later viewing by the device user.

For example the device 110 comprises a client program 132 that operates to provide a program guide that displays a listing of content that is scheduled for broadcast over the wireless access network 108. The device user may then select to receive any particular content for rendering in real-time or to be stored in a cache 134 for later viewing. For example the content clip may be scheduled for broadcast during the evening hours, and the device 112 operates to receive the broadcast and cache the content clip in the cache 134 so that the device user may view the clip the next day. Typically, the content is broadcast as part of a subscription service and the receiving device may need to provide a key or otherwise authenticate itself to receive the broadcast.

In one or more embodiments, the transport system allows the CS 122 to receive program-guide records, program contents, and other related information from content provider 102. The CS 122 updates and/or creates content for delivery to devices 110.

Figure 2:
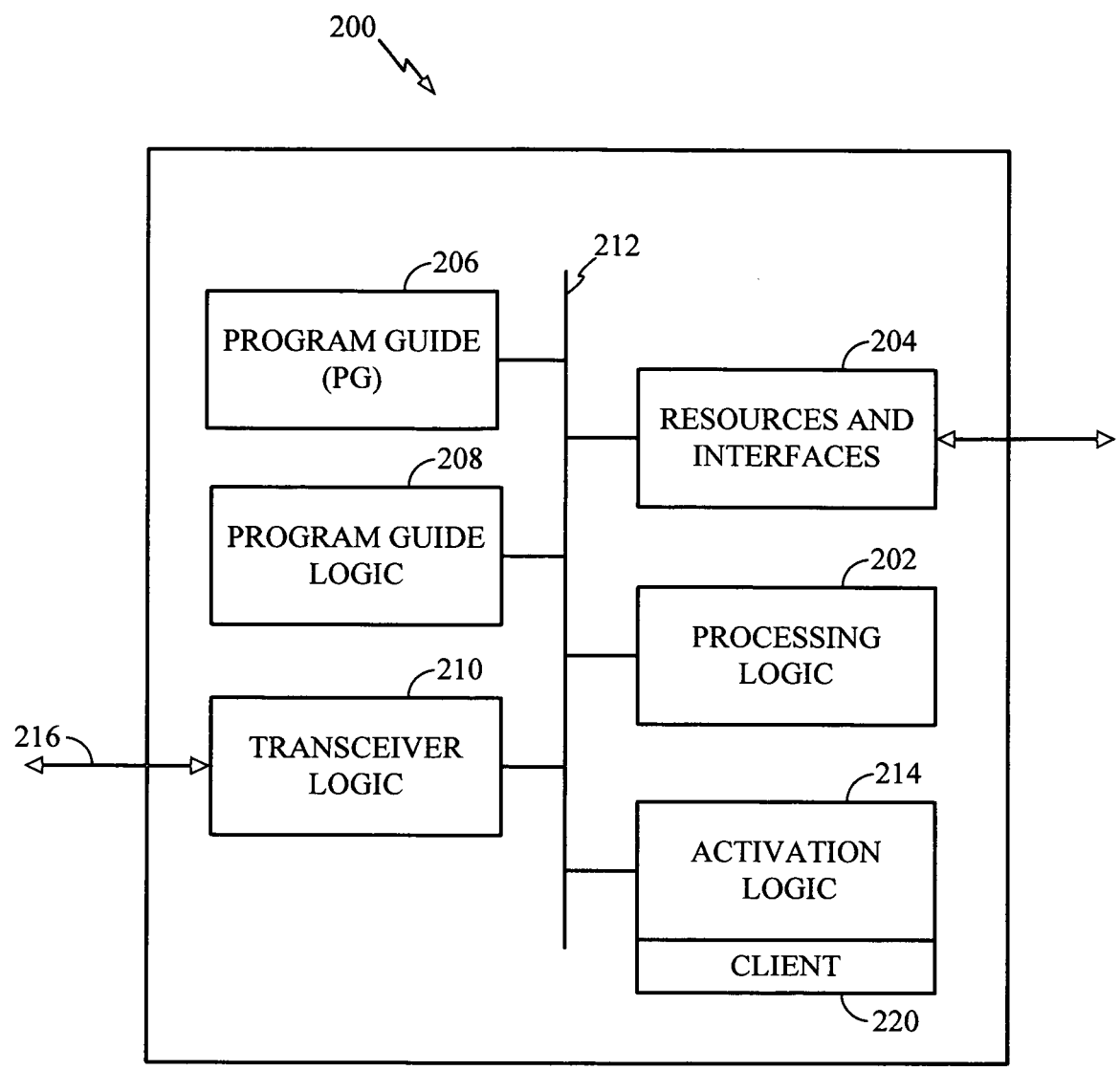
FIG. 2 shows one embodiment of a content provider suitable for use in one embodiment of the content delivery system.

FIG. 2 shows one embodiment of a content provider server 200 suitable for use in one embodiment of the content delivery system. For example, the server 200 may be used as the server 102 in FIG. 1. The server 200 comprises processing logic 202, resources and interfaces 204, and transceiver logic 210, all coupled to an internal data bus 212. The server 200 also comprises activation logic 214, PG 206, and PG records logic 208, which are also coupled to the data bus 212.

In one or more embodiments, the processing logic 202 comprises a CPU, processor, gate array, hardware logic, memory elements, virtual machine, software, and/or any combination of hardware and software. Thus, the processing logic 202 generally comprises logic to execute machine-readable instructions and to control one or more other functional elements of the server 200 via the internal data bus 212.

The resources and interfaces 204 comprise hardware and/or software that allow the server 200 to communicate with internal and external systems. For example, the internal systems may include mass storage systems, memory, display driver, modem, or other internal device resources. The external systems may include user interface devices, printers, disk drives, or other local devices or systems.

The transceiver logic 210 comprises hardware logic and/or software that operates to allow the server 200 to transmit and receive data and/or other information with remote devices or systems using communication channel 216. For example, in one embodiment, the communication channel 216 comprises any suitable type of communication link to allow the server 200 to communicate with a data network.

The activation logic 214 comprises a CPU, processor, gate array, hardware logic, memory elements, virtual machine, software, and/or any combination of hardware and software. The activation logic 214 operates to activate a CS and/or a device to allow the CS and/or the device to select and receive content and/or services described in the PG 206. In one embodiment, the activation logic 214 transmits a client program 220 to the CS and/or the device during the activation process. The client program 220 runs on the CS and/or the device to receive the PG 206 and display information about available content or services to the device user. Thus, the activation logic 214 operates to authenticate a CS and/or a device, download the client 220, and download the PG 206 for rendering on the device by the client 220.

The PG 206 comprises information in any suitable format that describes content and/or services that are available for devices to receive. For example, the PG 206 may be stored in a local memory of the server 200 and may comprise information such as content or service identifiers, scheduling information, pricing, and/or any other type of relevant information. In one embodiment, the PG 206 comprises one or more identifiable sections that are updated by the processing logic 202 as changes are made to the available content or services.

The PG record 208 comprises hardware and/or software that operates to generate notification messages that identify and/or describe changes to the PG 206. For example, when the processing logic 202 updates the PG 206, the PG records logic 208 is notified about the changes. The PG records logic 208 then generates one or more notification messages that are transmitted to CSs, which may have been activated with the server 200, so that these CSs are promptly notified about the changes to the PG 206.

In one embodiment, as part of the content delivery notification message, a broadcast indicator is provided that indicates when a section of the PG identified in the message will be broadcast. For example, in one embodiment, the broadcast indicator comprises one bit to indicate that the section will be broadcast and a time indicator that indicates when the broadcast will occur. Thus, the CSs and/or the devices wishing to update their local copy of the PG records can listen for the broadcast at the designated time to receive the updated section of the PG records.

In one embodiment, the content delivery notification system comprises program instructions stored on a computer-readable media, which when executed by a processor, for instance, the processing logic 202, provides the functions of the server 200 described herein. For example, the program instructions may be loaded into the server 200 from a computer-readable media, such as a floppy disk, CDROM, memory card, FLASH memory device, RAM, ROM, or any other type of memory device or computer-readable media that interfaces to the server 200 through the resources 204. In another embodiment, the instructions may be downloaded into the server 200 from an external device or network resource that interfaces to the server 200 through the transceiver logic 210. The program instructions, when executed by the processing logic 202, provide one or more embodiments of a guide state notification system as described herein.

During operation of one embodiment of the content delivery notification system, the CP server 200 performs one or more of the following functions.

1. A program guide is defined in one or more identifiable sections (i.e., service levels, blocks, time intervals, etc.) and delivered to CSs and/or devices on a data network during an activation process.
2. When one or more sections of the program guide are updated or changed, one or more notification messages are generated that identify the sections of the program guide that have been changed.
3. The notification messages are transmitted to CSs and/or devices in the data network. The CSs and/or devices process the notification messages to determine if their local versions of the PG need to be updated.
4. In one embodiment, one or more sections of the PG are broadcast from the server 200. These sections may comprise the entire PG or selected sections of the PG. The CSs and/or devices receive selected sections of the broadcasted PG and update their local copies of the PG as necessary.
5. In another embodiment, in response to receiving the notification messages, the CSs and/or devices transmit requests to the server 200 for one or more sections of the PG. The server 200 responds by transmitting the requested sections of the PG, which are used to update the local copies of the PG at the requesting CSs and/or devices.

Figure 3:
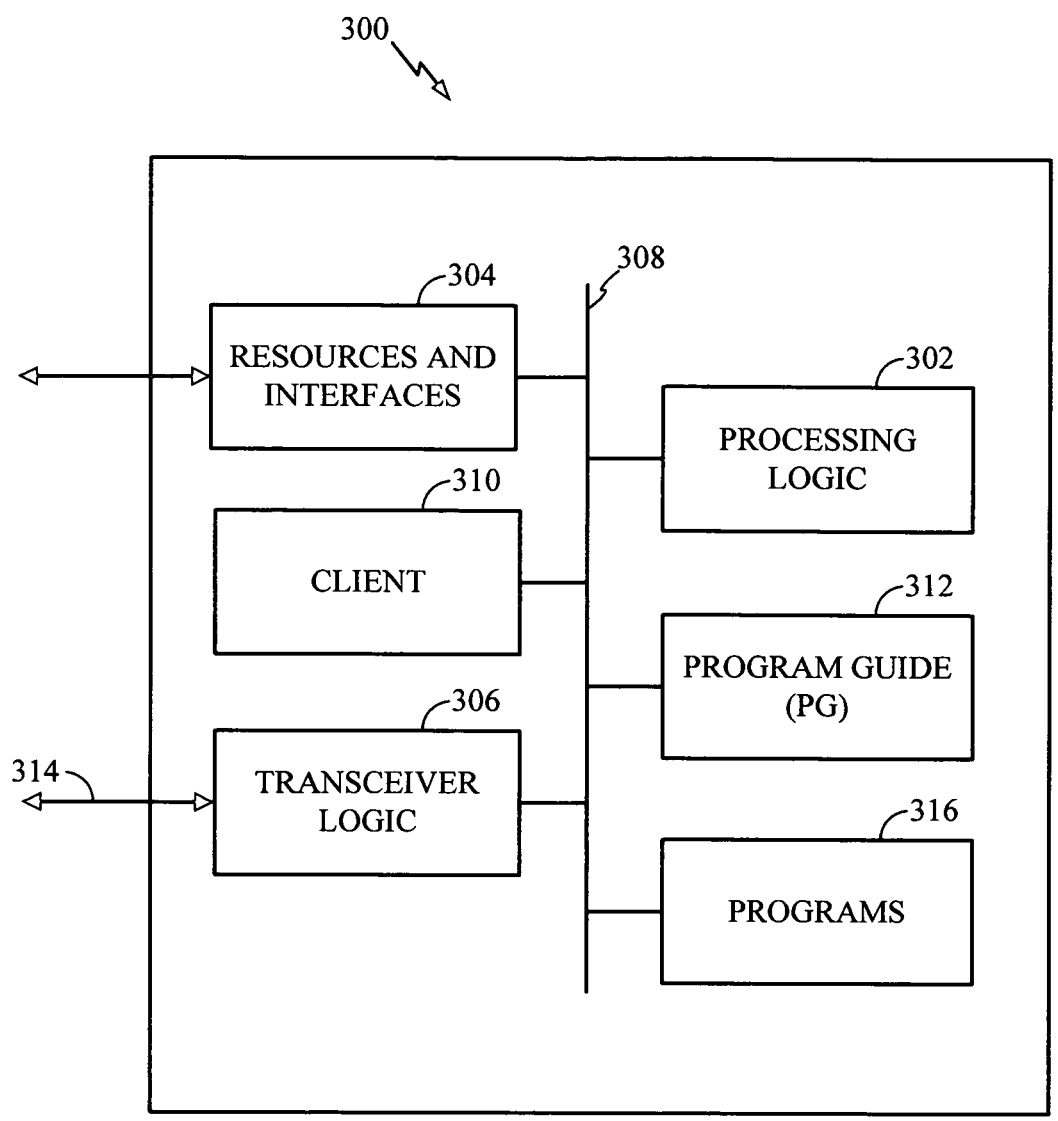
FIG. 3 shows one embodiment of a content server suitable for use in one embodiment of the content delivery system.

FIG. 3 shows one embodiment of a content server (CS) or device 300 suitable for use in one embodiment of a content delivery system. For example, CS 300 may be the CS 122 or the device 110 shown in FIG. 1. The CS 300 comprises processing logic 302, resources and interfaces 304, and transceiver logic 306, all coupled to a data bus 308. The CS 300 also comprises a client 310, a program logic 314 and a PG logic 312, which are also coupled to the data bus 308.

In one or more embodiments, the processing logic 302 comprises a CPU, processor, gate array, hardware logic, memory elements, virtual machine, software, and/or any combination of hardware and software. Thus, the processing logic 302 generally comprises logic configured to execute machine-readable instructions and to control one or more other functional elements of the CS 300 via the internal data bus 308.

The resources and interfaces 304 comprise hardware and/or software that allow the CS 300 to communicate with internal and external systems. For example, internal systems may include mass storage systems, memory, display driver, modem, or other internal device resources. The external systems may include user interface devices, printers, disk drives, or other local devices or systems.

The transceiver logic 306 comprises hardware and/or software that operate to allow the CS 300 to transmit and receive data and/or other information with external devices or systems through communication channel 314. For example the communication channel 314 may comprise a network communication link, a wireless communication link, or any other type of communication link.

During operation, the CS and/or the device 300 is activated so that it may receive available content or services over a data network. For example, in one embodiment, the CS and/or the device 300 identifies itself to a content provider server during an activation process. As part of the activation process, the CS and/or the device 300 receives and stores PG records by PG logic 312. The PG 312 contains information that identifies content or services available for the CS 300 to receive. The client 310 operates to render information in the PG logic 312 on the CS and/or the device 300 using the resources and interfaces 304. For example, the client 310 renders information in the PG logic 312 on a display screen that is part of the device. The client 310 also receives user input through the resources and interfaces so that a device user may select content or services.

In one embodiment, the CS 300 receives notification messages through the transceiver logic 306. For example, the messages may be broadcast or unicast to the CS 300 and received by the transceiver logic 306. The PG notification messages identify updates to the PG records at the PG logic 312. In one embodiment, the client 310 processes the PG notification messages to determine whether the local copy at the PG logic 312 needs to be updated. For example, in one embodiment, the notification messages include a section identifier, start time, end time, and version number. The CS 300 operates to compare the information in the PG notification messages to locally stored information at the existing PG logic 312. If the CS 300 determines from the PG notification messages that one or more sections of the local copy at the PG logic 312 needs to be updated, the CS 300 operates to receive the updated sections of the PG in one of several ways. For example, the updated sections of the PG may be broadcasted at a time indicated in the PG notification messages, so that the transceiver logic 306 may receive the broadcasts and pass the updated sections to the CS 300, which in turn updates the local copy at the PG logic 312.

In another embodiment, the CS 300 determines which sections of the PG need to be updated based on the received PG update notification messages, and transmits a request to a CP server to obtain the desired updated sections of the PG. For example, the request may be formatted using any suitable format and comprise information such as a requesting CS identifier, section identifier, version number, and/or any other suitable information.

In one embodiment, the CS 300 performs one or more of the following functions in one or more embodiments of a PG notification system. It should be noted that the following functions might be changed, rearranged, modified, added to, deleted, or otherwise adjusted within the scope of the embodiments.

1. The CS is activated for operation with a content provider system to receive content or services. As part of the activation process, a client and PG are transmitted to the CS.
2. One or more PG notification messages are received by the CS and used to determine if one or more sections of the locally stored PG need to be updated.
3. In one embodiment, if the CS determines that one or more sections of the locally stored PG need to be updated, the CS listens to a broadcast from the distribution system to obtain the updated sections of the PG that it needs to update its local copy.
4. In another embodiment, the CS transmits one or more request messages to the CP to obtain the updated sections of the PG it needs.
5. In response to the request, the CP transmits the updated sections of the PG to the CS.
6. The CS uses the received updated sections of the PG to update its local copy of the PG.

In one embodiment, the content delivery system comprises program instructions stored on a computer-readable media, which when executed by a processor, such as the processing logic 302, provides the functions of the content delivery notification system as described herein. For example, instructions may be loaded into the CS 300 from a computer-readable media, such as a floppy disk, CDROM, memory card, FLASH memory device, RAM, ROM, or any other type of memory device or computer-readable media that interfaces to the CS 300 through the resources and interfaces 304. In another embodiment, the instructions may be downloaded into the CS 300 from a network resource that interfaces to the CS 300 through the transceiver logic 306. The instructions, when executed by the processing logic 302, provide one or more embodiments of a contnt delivery system as described herein.

It should be noted that the CS 300 represents just one implementation and that other implementations are possible within the scope of the embodiments.

Figure 4:
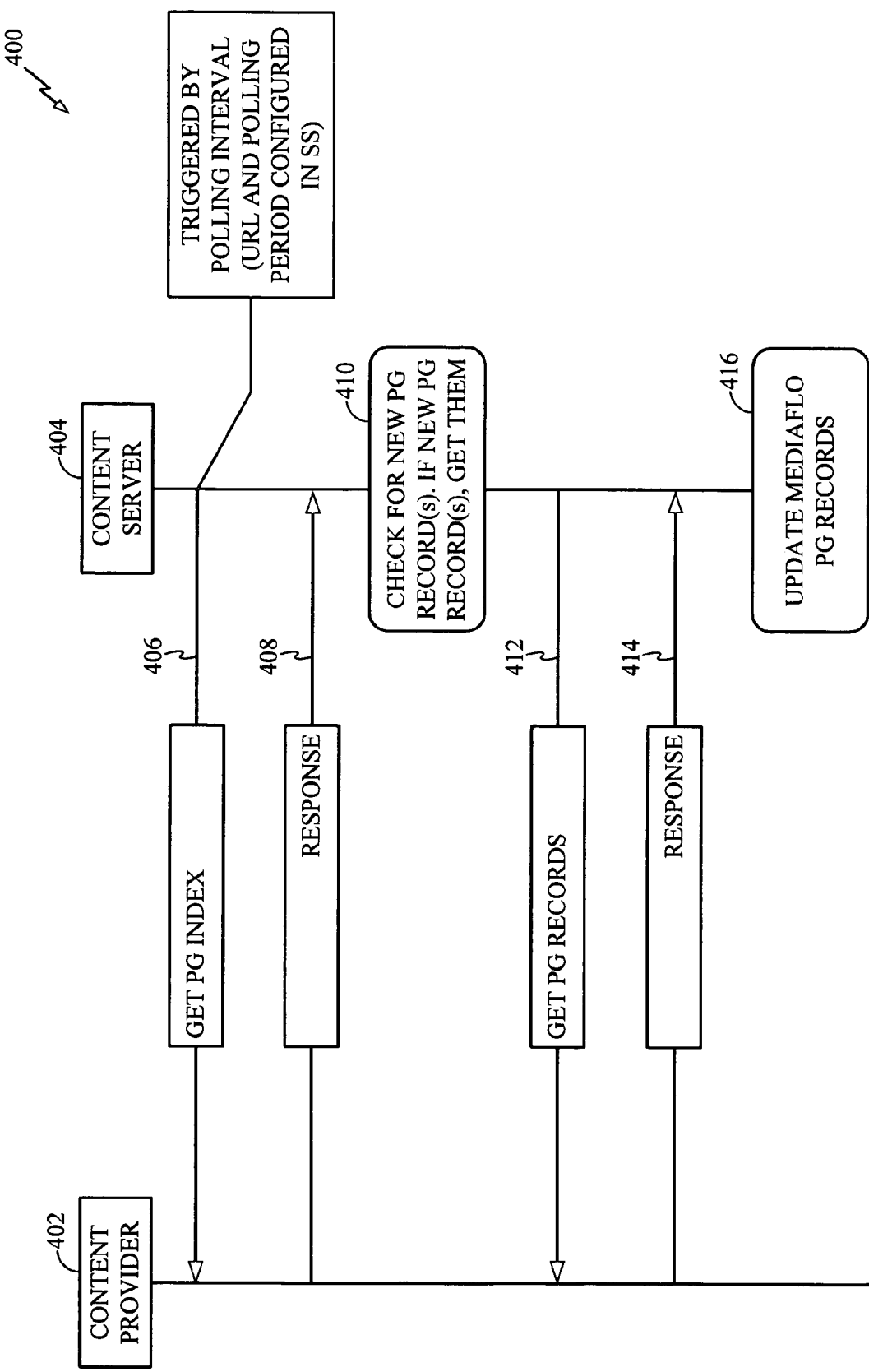
FIG. 4 shows one embodiment of pulling program guide information from a content provider system.

FIG. 4 shows one embodiment of a method 400 for providing one embodiment of a PG records update system. For clarity, the method 400 is described herein with reference to the CP 402 and CS 404, as described above in reference with FIGS. 2 and 3.

At block 406, a method for maintaining program-guide records starts with requesting a program-guide index from a CP 402. The request may be based on a regular or scheduled polling, any predetermined frequency, or based on need as determined by CS or another entity. After receiving the program-guide index from CP 402, in block 408, the CS 404 determines whether there exists any new program-guide record based on the received program-guide index, in block 410. If there were any updated or new PG records, the CS 404 requests for the new program-guide record, in block 412. The CS 404 receives the new or updated program-guide records from the CP 402, in block 414, and may update the program-guide records maintained locally at the CS 404, in block 416.

Figure 5A:
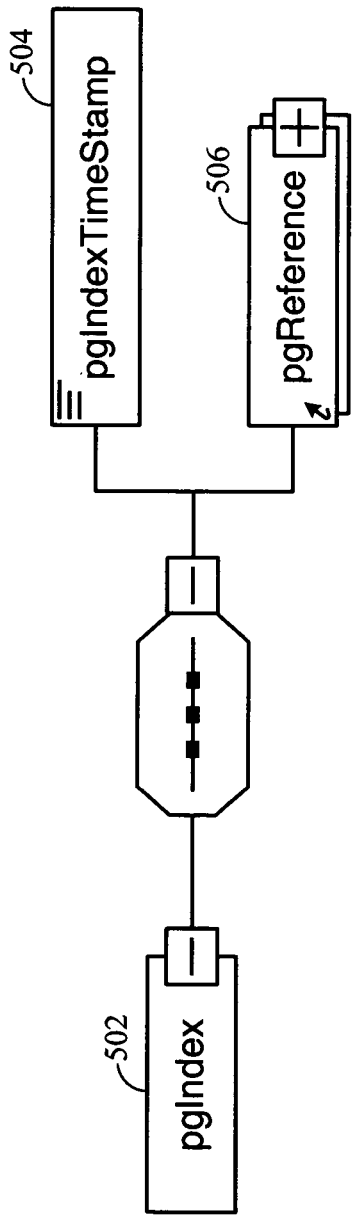
FIG. 5A and FIG. 5B show one embodiment of a program-guide index.
Figure 5B:
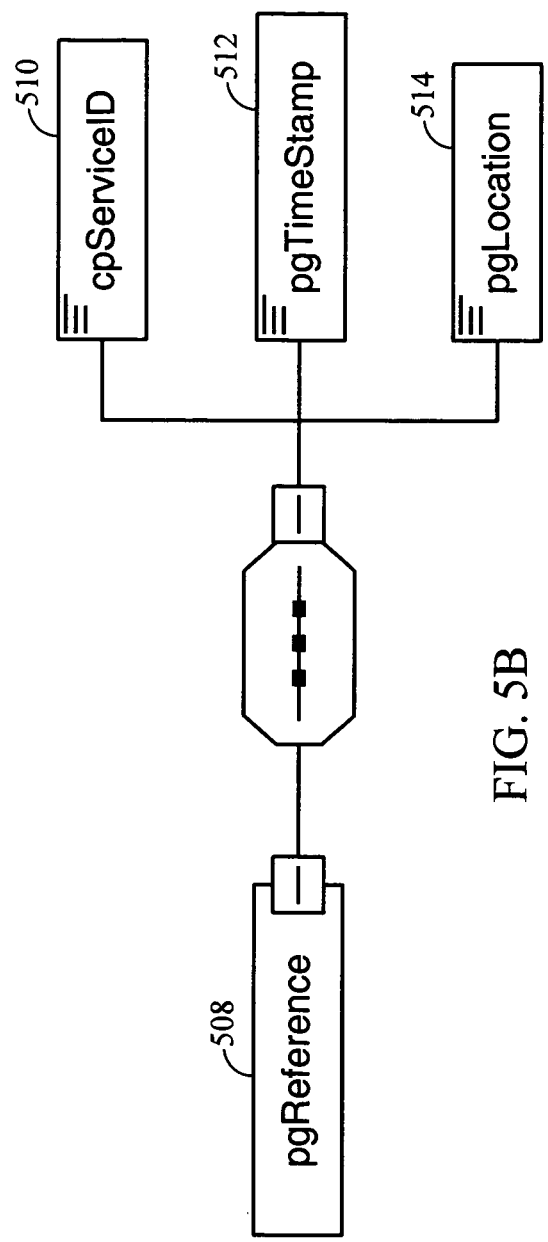

FIGS. 5A and 5B show one embodiment of a program-guide index. The PG index 502 comprises at least one of a program-guide-index time stamp 504 and a program guide reference 506. The program reference 506 comprises at least one of a content provider service ID 510, a program guide time stamp 512, and a program guide location 514.

Figure 6A:
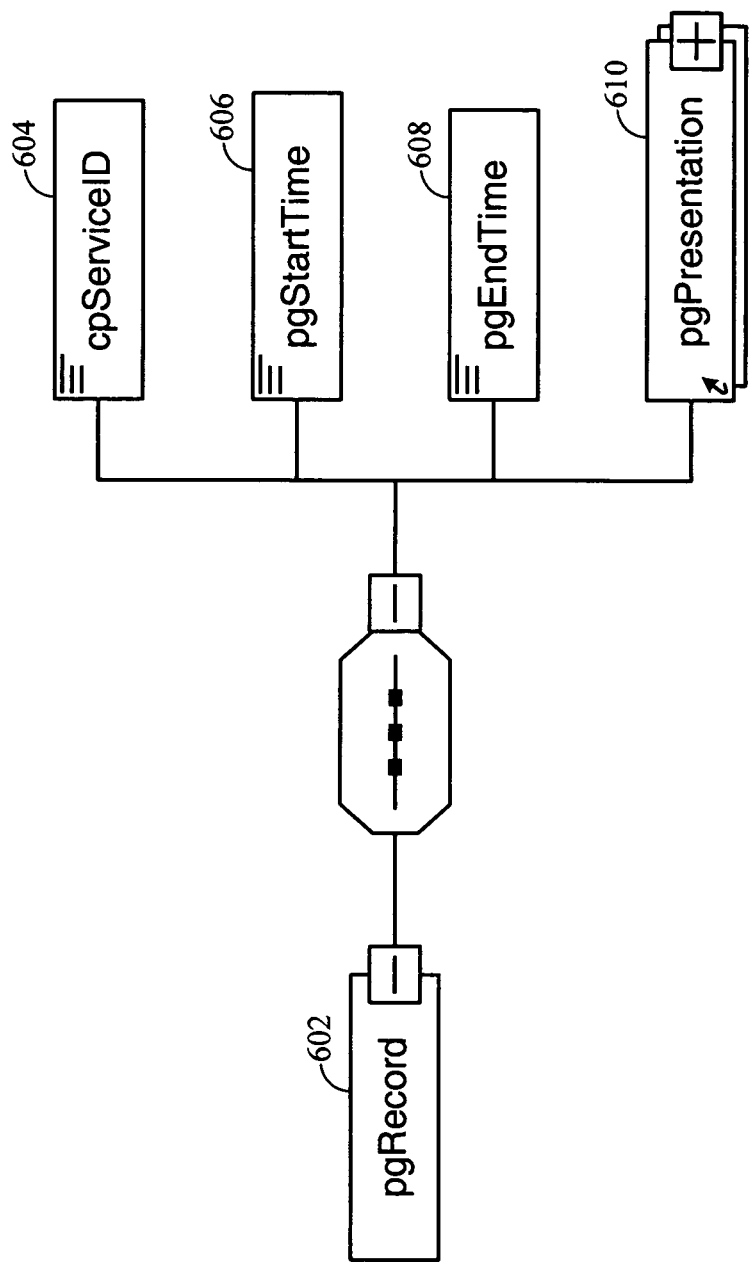
FIG. 6A and FIG. 6B show one embodiment of a program-guide record.
Figure 6B:
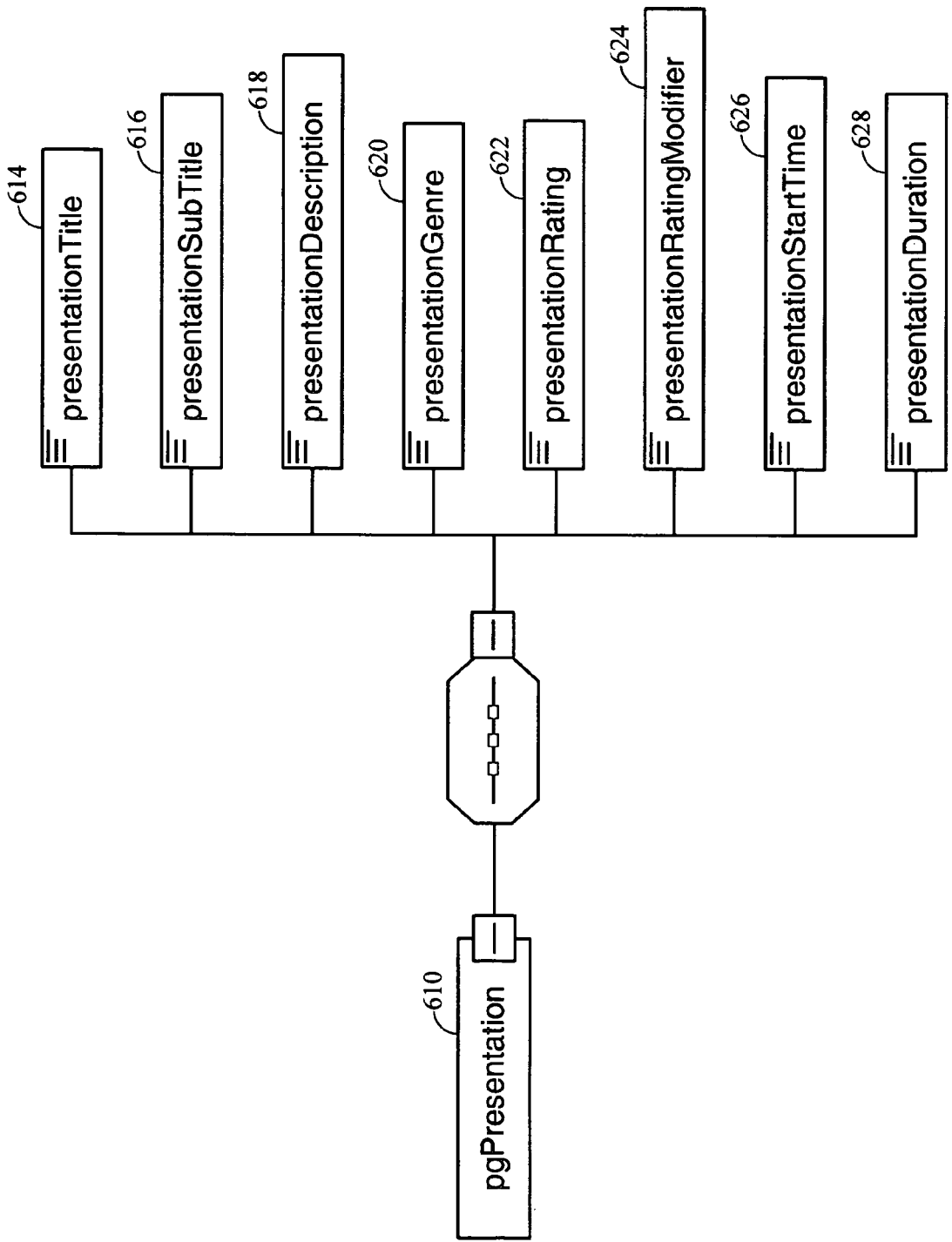

FIGS. 6A and 6B show one embodiment of a PG record. The PG 602 comprises at least one of a CP service ID 604, a PG start time 606, a PG end time 608, and a PG presentation 610. The PG presentation 610, shown in FIG. 6B, comprises at least one of presentation title 614, a presentation sub-title 616, a presentation description 618, a presentation genre 620, a presentation rating 622, a presentation rating modifier 624, a presentation start time 626, and a presentation duration 628.

Figure 7:
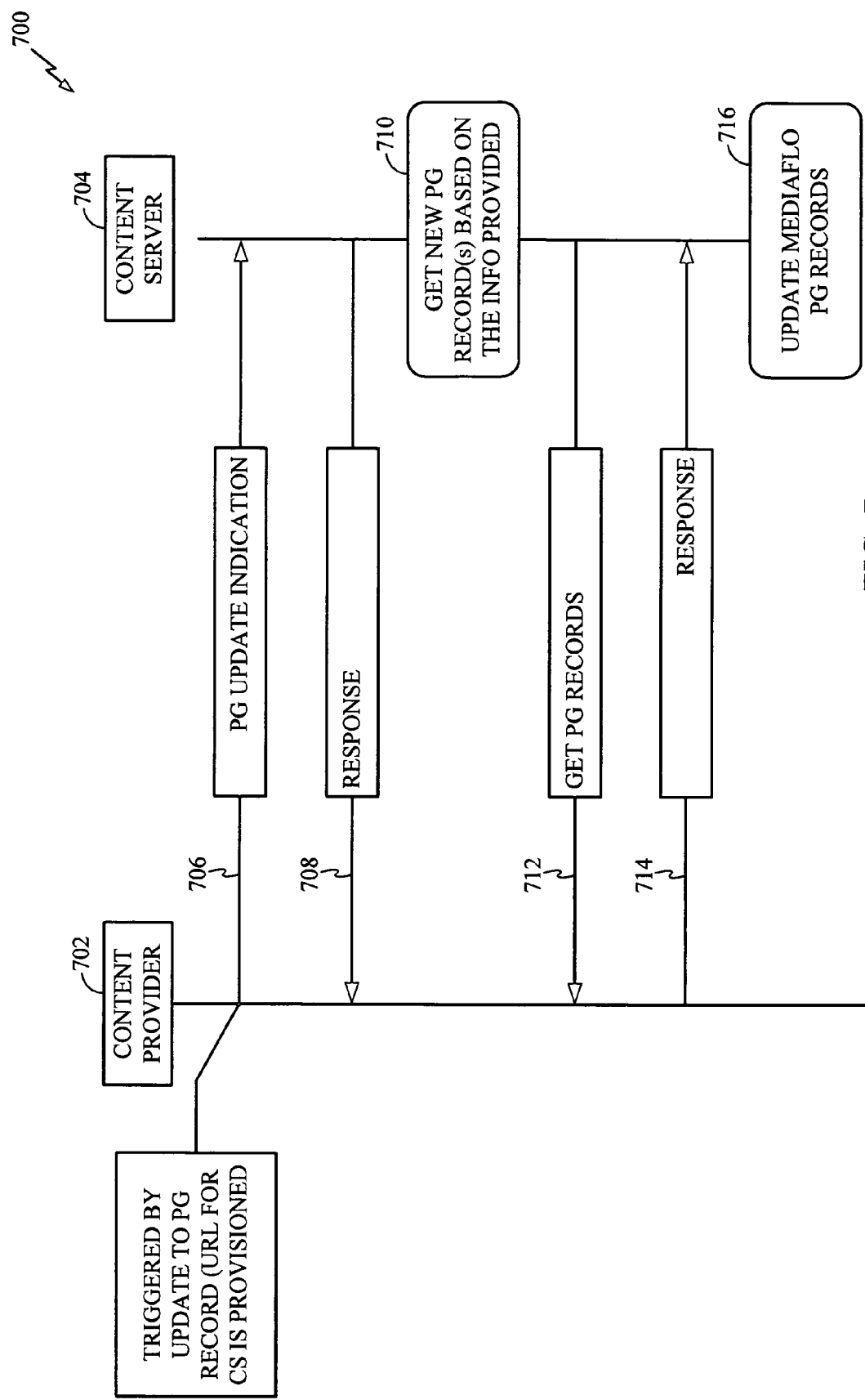
FIG. 7 shows one embodiment of pushing program guide information to a content server system.

FIG. 7 shows one embodiment of a method 700 for providing one embodiment of a PG records update system. For clarity, the method 700 is described herein with reference to the CP 702 and CS 704, as described above in reference with FIGS. 2 and 3.

A method for updating program-guide records starts with the CP 702 sending a program guide update indication, in block 706. Sending the update indication may be based on unscheduled updates that occur to the PG records at the CP 702. The updated indication may be sent also based on a predetermined frequency, or based on a request from CS 704 or any other entity in the network. The CS 704 may send a response, in block 708, to the CP 702 upon receiving the update indication. Based on the received update indication, the CS 704 may determine any new or updated program-guide record, in block 710. If there were any updated or new PG records, the CS 704 may request for a new or updated program-guide record, in block 712, without waiting for any scheduled polling routine. The CS 704 receives the requested program-guide record from the CP 702, in block 714, and may update the program-guide records maintained locally at the CS 704, in block 716.

Figure 8:
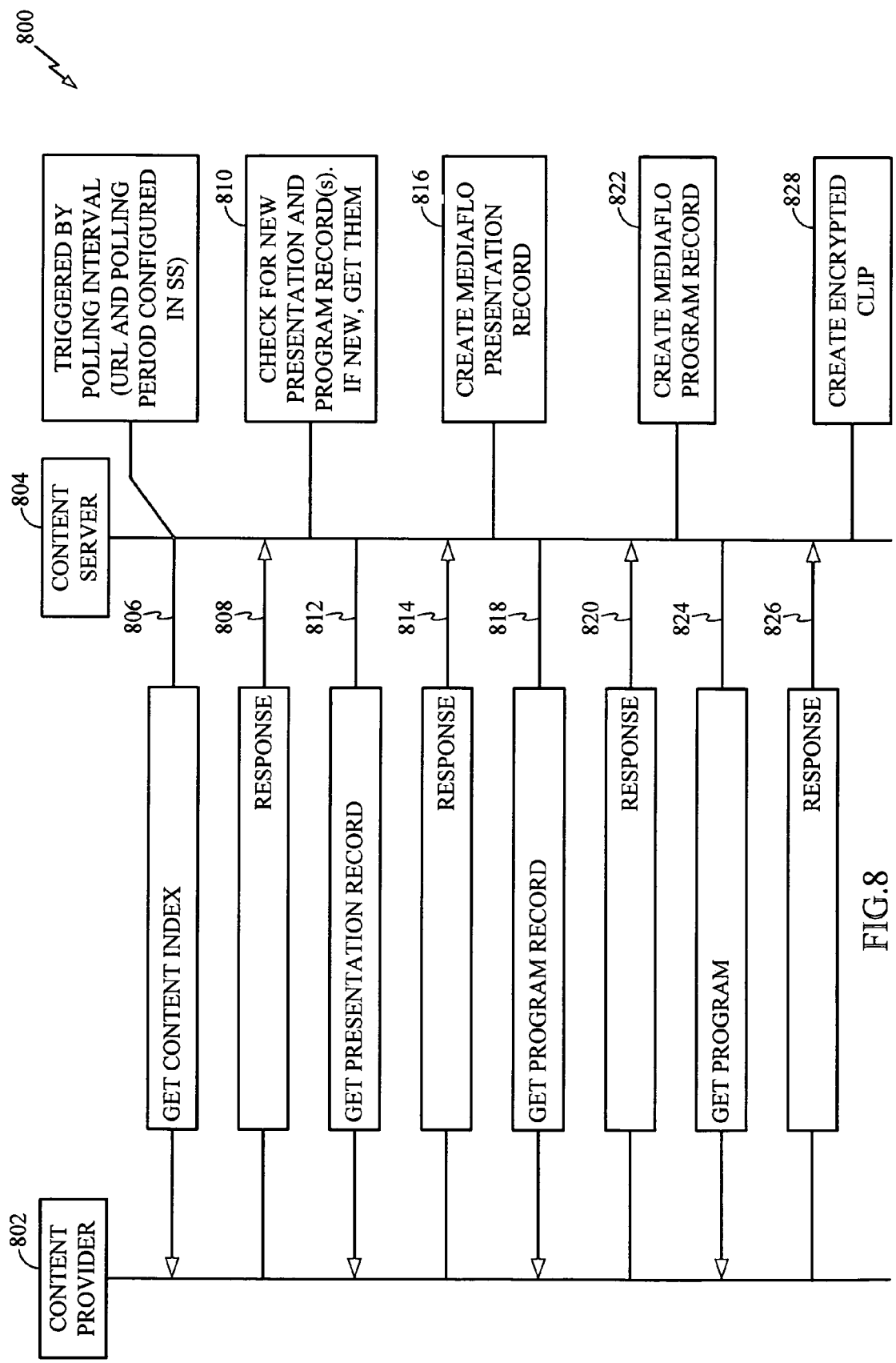
FIG. 8 shows one embodiment of pulling content information from a content provider system.

FIG. 8 shows one embodiment of a method 800 for providing content records. For clarity, the method 800 is described herein with reference to the CP 802 and CS 804, as described above in reference with FIGS. 2 and 3.

At block 806, a method for providing content records starts with requesting a content index from a CP 802. The request may be based on a regular polling schedule, any predetermined schedule, or based on need as determined by CS 804 or another entity in the network. In one embodiment, the request may comprise of the URL address of the entity that provides content, which may be the same or different from the entity that provides PG information. After receiving the content index in block 808, the CS 804 determines whether there exists any new program or presentations records based on the received content index, in block 810. If there were any updated an/or new program or presentations records, the CS 804 requests for at least one new presentation record, in block 812. The CS 804 receives the presentation records from the CP 802, in block 814, and may create and/or updates the presentation records maintained locally at the CS 804, in block 816. The presentation record may comprise at least one program record. For example, the presentation record may identify a "News" presentation, which may comprise "Commercial" programs. Similarly, the CS 804 requests for a new program record, in block 818. The CS 804 receives the program records from the CP, in block 820, and may create and/or update the program records maintained locally at the CS 804, in block 822. Eventually, the CS 804 may request program contents, based on the received presentation and/or program records, in block 824. The CS 804 may create program contents, which may include encryption, encoding, compression, and other actions as required for providing content to end user's devices.

Figure 9A:
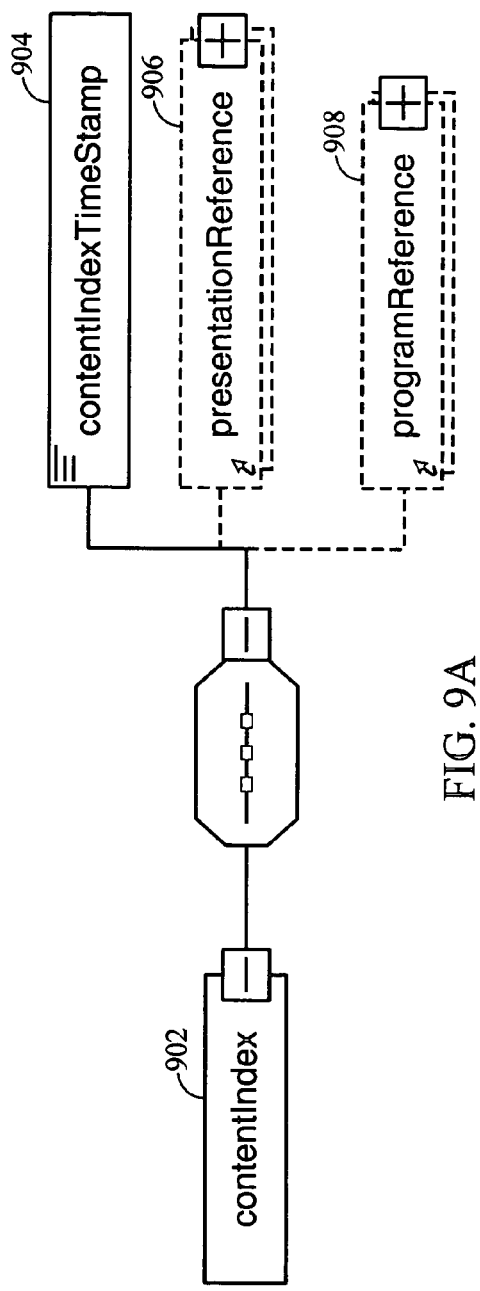
FIG. 9A through FIG. 9C show one embodiment of a content index.
Figure 9B:
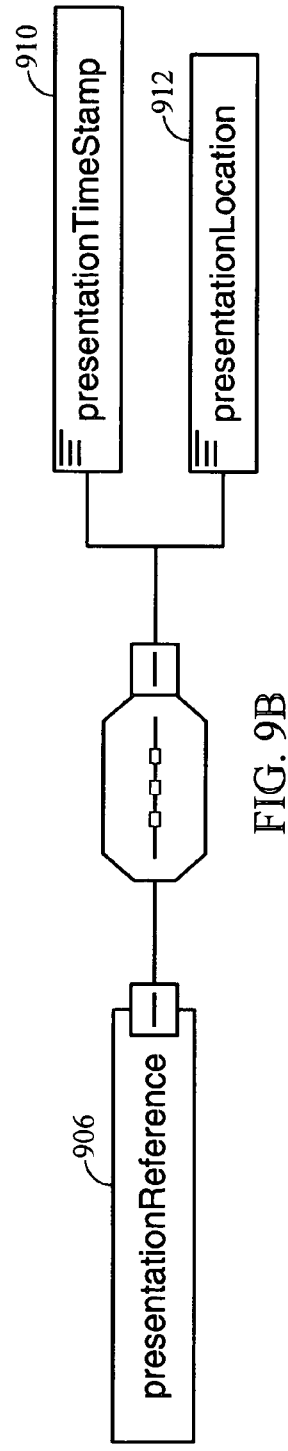
Figure 9C:
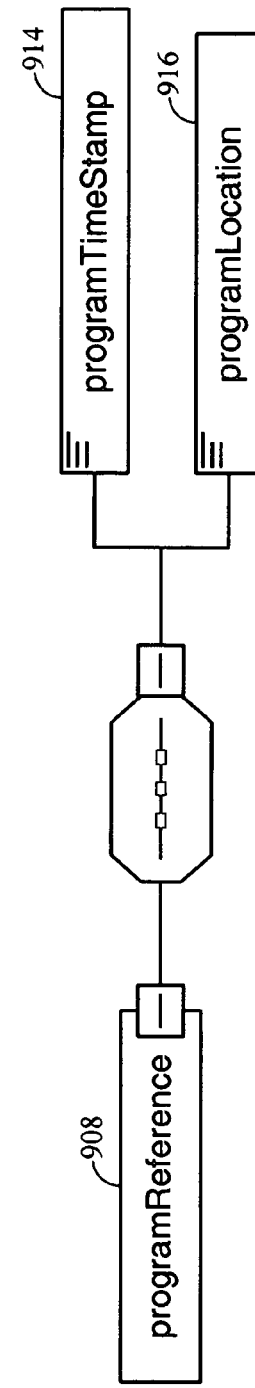

FIGS. 9A through 9C show one embodiment of a content index. The content index 902 comprises at least one of a content-index time stamp 904, a presentation reference 906, and a program reference 908. The program reference 906, shown in FIG. 9B, comprises at least one of a presentation time stamp 910 and a presentation location 912. The program reference 908, shown in FIG. 9C, comprises a program time stamp 914 and a program location 916.

Figure 10:
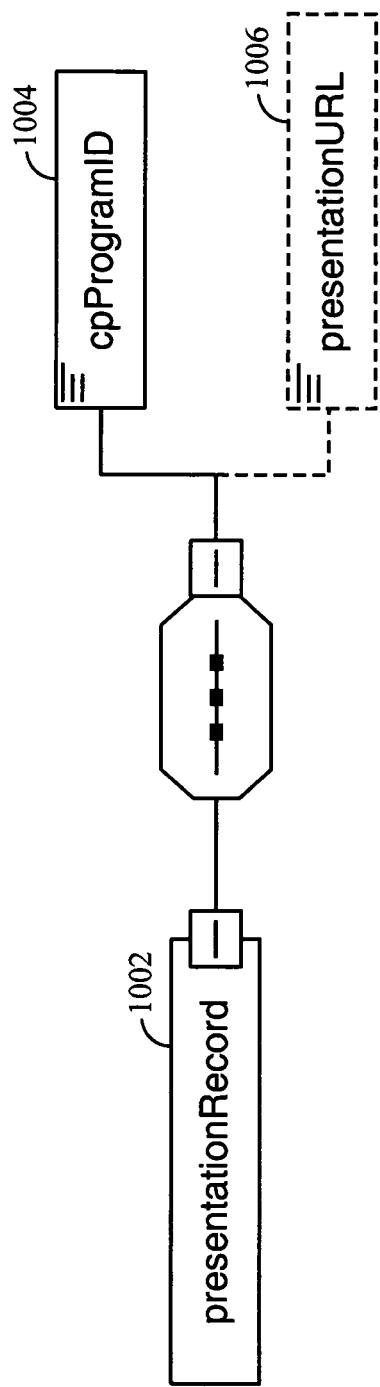
FIG. 10 shows one embodiment of a presentation record.

FIG. 10 shows one embodiment of a presentation record. The presentation record 1002 comprises a CP program ID 1004 and a presentation location information 1006, e.g., an URL address.

Figure 11A:
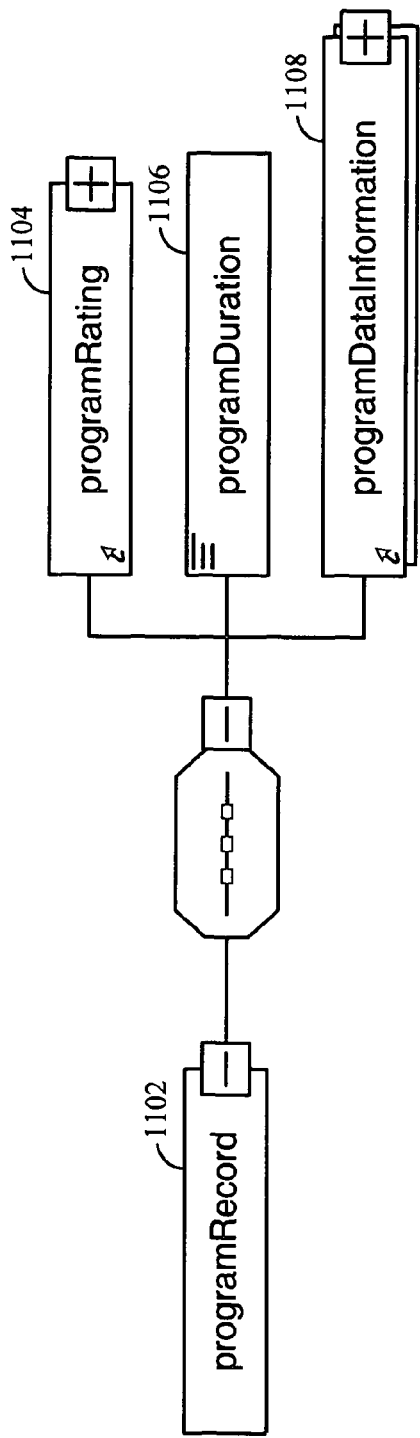
FIG. 11A through FIG. 11C show one embodiment of a program record.
Figure 11B:
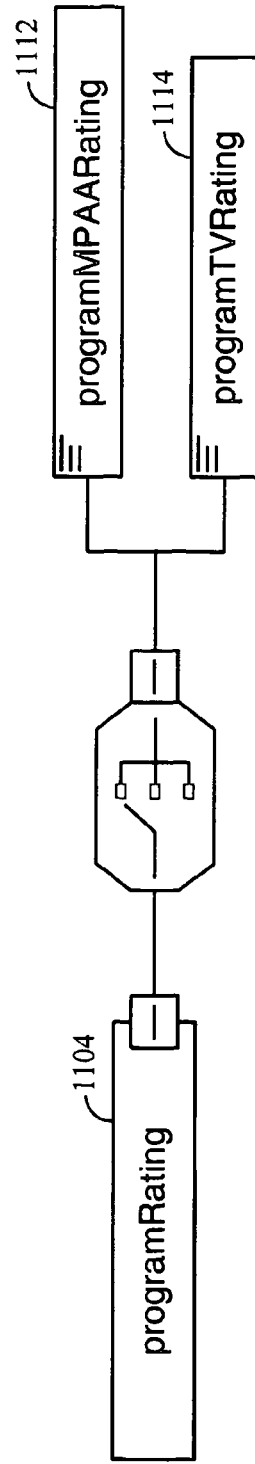
Figure 11C:
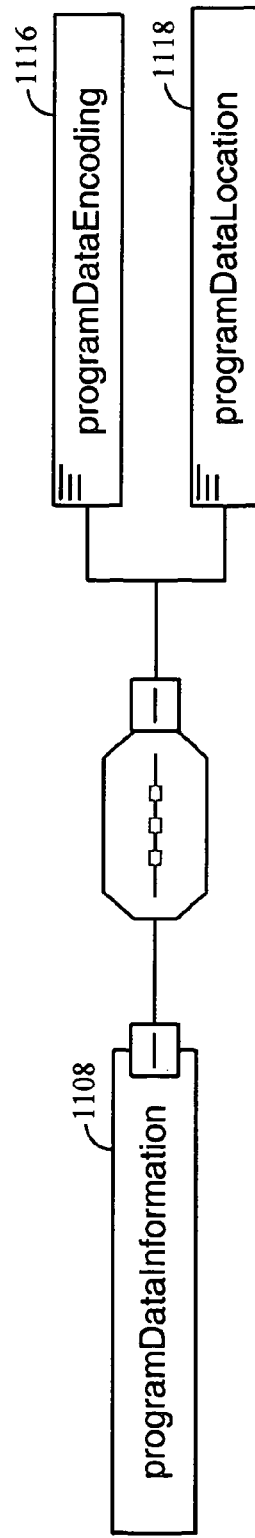

FIGS. 11A through 11C show one embodiment of a program record. The program record 1102 comprises at least one of a program rating 1104, a program duration 1106, and a program content information 1108. The program rating 1104 comprises at least one of a program MPAA rating 1112, a program TV rating 1114, or other rating scheme. The program content information 1108 comprises a program content encoding scheme 1116 and a program content location 1118.

Figure 12A:
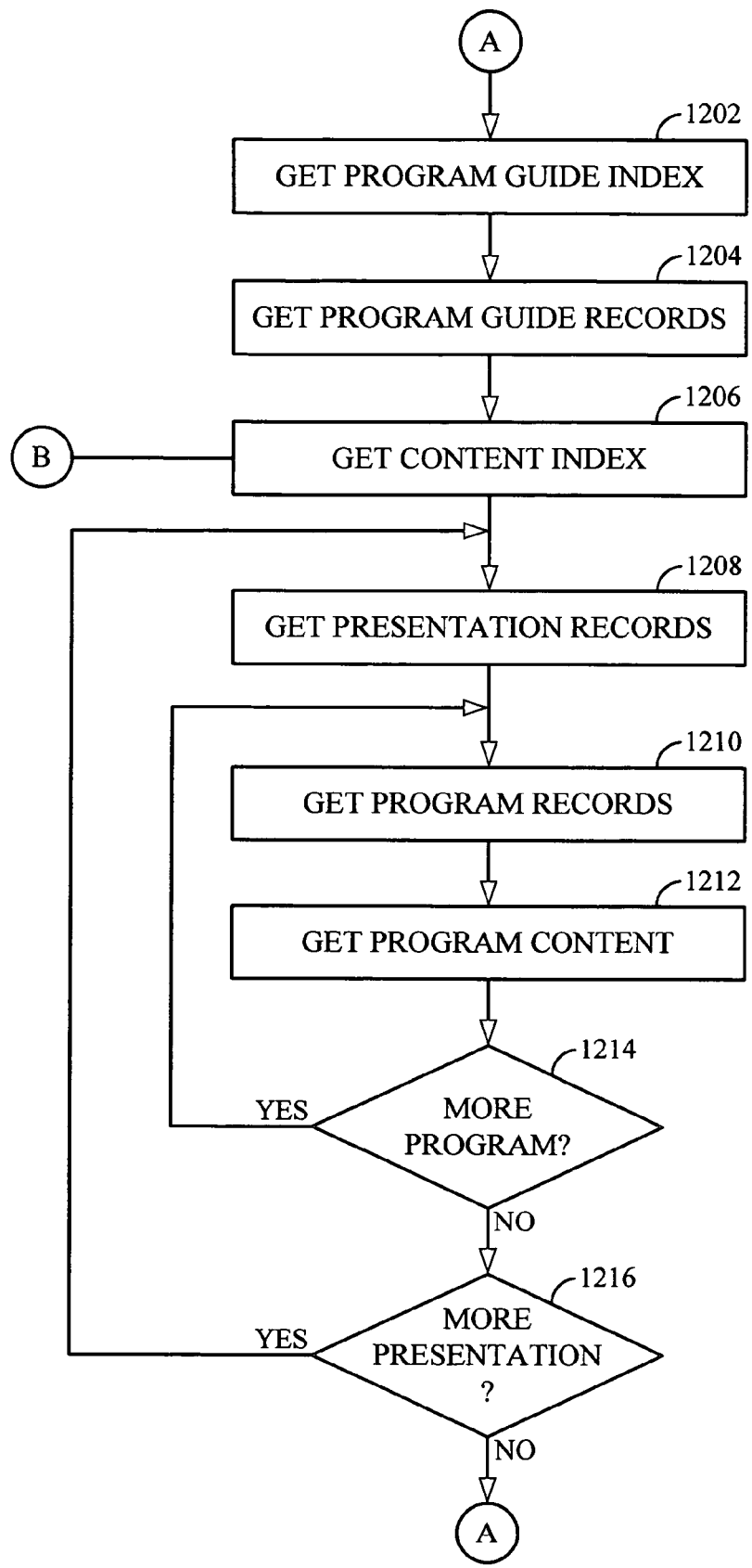
FIG. 12A and FIG. 12B show one embodiment of a content information delivery system.
Figure 12B:
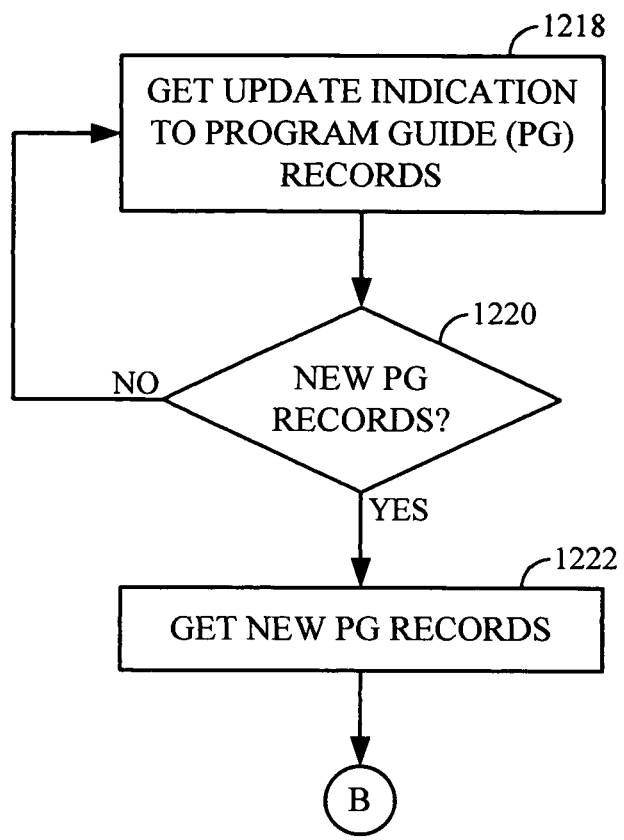

FIGS. 12A and 12B show a flow chart for a media information delivery system and method. In block 1202, a content server (CS) receives program-guide index from a content provider (CP). The index may be requested by the CS, sent by another entity, or send by the CP. In block 1204, at least one CS may request a program-guide records from the CP, based on availability of any new or updated program guide at the CP. In one embodiment, as shown in FIG. 12B, blocks 1218 through 1222, the CP may provide a program guide update indication to at least one CS, and the CS may request a new or updated PG record from the CP.

In any case, the CS receives content index from the CP in block 1206. The content index may identify at least one presentation record, which may comprise at least one program record. In block 1208, the CS may request at least one presentation record. In block 1210, the CS may request at least one of the program records associated with the current presentation. Consequently, the CS may also request a program content from the CP, in block 1212. In block 1214, it is determined if there were more program records associated with the current presentation. If there were more programs, CS may request such programs in blocks 1210 through 1212. In block 1216, it is determined if there were more presentations. If there were more presentations, CS may request such presentations, as well as the associated programs, in blocks 1208 through 1214. After all scheduled presentations are processed, the process restarts at block 1202 for next scheduled polling of the content provider, or at block 1218 for receiving the next update indication from the CP.

Thus, while one or more embodiments of a content delivery system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims

What is claimed is:

1. A method for maintaining program-guide records on a content server, the method comprising:
   storing a set of program-guide records on the content server, each program-guide record describing a section of a program guide and being collectively used to generate a program guide;
   requesting a program-guide index from a content provider;
   receiving the requested program-guide index from the content provider;
   using the requested program-guide index, which was received from the content provider, to identify new program-guide records;
   requesting the identified new program-guide records, which were identified using the requested program-guide index, from the content provider;
   receiving the identified new program-guide records from the content provider; and
   updating the stored program-guide records on the content server using the received new program-guide records.

2. The method of claim 1, wherein said program-guide index comprises at least one of a program-guide-index time stamp or a program-guide reference.

3. The method of claim 2, wherein said program-guide reference comprises at least one of a content provider service ID, a program-guide time stamp, or a program-guide location.

4. The method of claim 1, wherein said program-guide record comprises at least one of a content-provider service ID, a program-guide start time, a program-guide end time, or a program guide presentation.

5. The method of claim 4, wherein said program-guide presentation comprises at least one of presentation title, a presentation sub-title, a presentation description, a presentation genre, a presentation rating, a presentation rating modifier, a presentation start time, or a presentation duration.

6. The method of claim 1, wherein requesting the program-guide index from the content provider is triggered by a polling interval.

7. The method of claim 1, wherein requesting the program-guide index from the content provider is based on need as determined by the content server or another entity.

8. A method for maintaining content records on a content server, the method comprising:

storing, on the content server, a set of content records, each content record describing a piece of content and collectively describing the content available from a content provider;
requesting a content index from a content provider;
receiving the requested content index on the content server;
using the requested content index to identify new content records;
requesting the identified new content records, which were identified using the requested content index, from the content provider;
receiving the identified new content records from the content provider;
updating the set of content records on the content server using the received new content records; and
requesting content for distribution to users based on the content records.

9. The method of claim 8, wherein said content index comprises at least one of a content-index time stamp, a presentation reference, or a program reference.

10. The method of claim 9, wherein said presentation reference comprises at least one of a presentation time stamp or a presentation location.

11. The method of claim 9, wherein said program reference comprises at least one of a program time stamp or a program location.

12. The method of claim 8, wherein said content record comprises a presentation record.

13. The method of claim 12, wherein said presentation record comprises at least one of content-provider program ID or presentation location.

14. The method of claim 12, wherein requesting content for distribution to users based on the content records further comprises:
requesting at least one presentation from the content provider; and receiving the requested presentation on the content server.

15. The method of claim 12, wherein said presentation record comprises a program record.

16. The method of claim 15, wherein said program record comprises at least one of program rating, program duration, or program content information.

17. The method of claim 16, wherein said program rating comprises at least one of MPAA rating or TV rating.

18. The method of claim 16, wherein said program content information comprises at least one of program content encoding information or program content location information.

19. The method of claim 15, further comprising:
requesting, from the content provider, at least one program identified in a stored program record; and
receiving the requested program from the content provider.

20. The method of claim 8, wherein requesting the content index from the content provider is triggered by a polling interval.

21. The method of claim 8, wherein requesting the content index from the content provider is based on need as determined by the content server or another entity.

22. An apparatus for maintaining program-guide records on a content server, the apparatus comprising:
means for storing, in a cache, a set of program-guide records on the content server, each program-guide record describing a section of a program guide and being collectively used to generate a program guide;
means for requesting a program-guide index from a content provider;
means for receiving the requested program-guide index from the content provider;
means for using the requested program-guide index, which was received from the content provider, to identify new program-guide records;
means for requesting the identified new program-guide records, which were identified using the requested program-guide index, from the content provider;
means for receiving the identified new program-guide records from the content provider; and
means for updating the stored program-guide records on the content server using the received new program-guide records.

23. The apparatus of claim 22, wherein said program-guide index comprises at least one of a program-guide-index time stamp or a program-guide reference.

24. The apparatus of claim 23, wherein said program-guide reference comprises at least one of a content provider service ID, a program-guide time stamp, or a program-guide location.

25. The apparatus of claim 22, wherein said program-guide record comprises at least one of a content-provider service ID, a program-guide start time, a program-guide end time, or a program guide presentation.

26. The apparatus of claim 25, wherein said program-guide presentation comprises at least one of presentation title, a presentation sub-title, a presentation description, a presentation genre, a presentation rating, a presentation rating modifier, a presentation start time, or a presentation duration.

27. The apparatus of claim 22, wherein said means for requesting the program-guide index from the content provider is triggered by a polling interval.

28. The apparatus of claim 22, wherein said means for requesting the program-guide index from the content provider is based on need as determined by the content server or another entity.

29. A non-transitory computer-readable storage medium having stored thereon processor-executable instructions configured to cause a processor to perform operations comprising:
storing a set of program-guide records on a content server, each program-guide record describing a section of a program guide and being collectively used to generate a program guide;
requesting a program-guide index from a content provider;
receiving the requested program-guide index from the content provider;
using the requested program-guide index, which was received from the content provider, to identify new program-guide records;
requesting the identified new program-guide records, which were identified using the requested program-guide index, from the content provider;
receiving the identified new program-guide records from the content provider; and
updating the stored program-guide records on the content server using the received new program-guide records.

30. The non-transitory computer-readable storage medium of claim 29, wherein said program-guide index comprises at least one of a program-guide-index time stamp or a program-guide reference.

31. The non-transitory computer-readable storage medium of claim 30, wherein said program-guide reference comprises at least one of a content provider service ID, a program-guide time stamp, or a program-guide location.

32. The non-transitory computer-readable storage medium of claim 29, wherein said program-guide record comprises at least one of a content-provider service ID, a program-guide start time, a program-guide end time, or a program guide presentation.

33. The non-transitory computer-readable storage medium of claim 32, wherein said program-guide presentation comprises at least one of presentation title, a presentation subtitle, a presentation description, a presentation genre, a presentation rating, a presentation rating modifier, a presentation start time, or a presentation duration.

34. The non-transitory computer-readable storage medium of claim 29, wherein said requesting the program-guide index from the content provider is triggered by a polling interval.

35. The non-transitory computer-readable storage medium of claim 29, wherein said requesting the program-guide index from the content provider is based on need as determined by the content server or another entity.

36. An apparatus for maintaining program-guide records on a content server, comprising:
    logic for storing a set of program-guide records on the content server, each program-guide record describing a section of a program guide and being collectively used to generate a program guide;
    logic for requesting a program-guide index from a content provider;
    logic for receiving the requested program-guide index from the content provider;
    logic for using the requested program-guide index, which was received from the content provider, to identify new program-guide records;
    logic for requesting the identified new program-guide records, which were identified using the requested program-guide index, from the content provider;
    logic for receiving the identified new program-guide records from the content provider; and
    logic for updating the stored program-guide records on the content server using the received new program-guide records.

37. The apparatus of claim 36, wherein said program-guide index comprises at least one of a program-guide-index time stamp or a program-guide reference.

38. The apparatus of claim 37, wherein said program-guide reference comprises at least one of a content provider service ID, a program-guide time stamp, or a program-guide location.

39. The apparatus of claim 36, wherein said program-guide record comprises at least one of a content-provider service ID, a program-guide start time, a program-guide end time, or a program guide presentation.

40. The apparatus of claim 39, wherein said program-guide presentation comprises at least one of presentation title, a presentation sub-title, a presentation description, a presentation genre, a presentation rating, a presentation rating modifier, a presentation start time, or a presentation duration.

41. The apparatus of claim 36, wherein said logic for requesting the program-guide index from the content provider is triggered by a polling interval.

42. The apparatus of claim 36, wherein logic for requesting the program-guide index from the content provider is based on need as determined by the content server or another entity.

43. An apparatus for maintaining content records on a content server, the apparatus comprising:
    means for storing, on the content server, a set of content records, each content record describing a piece of content and collectively describing the content available from a content provider;
    means for requesting a content index from a content provider;
    means for receiving the requested content index on the content server;
    means for using the requested content index to identify new content records;
    means for requesting the identified new content records, which were identified using the requested content index, from the content provider;
    means for receiving the identified new content records from the content provider;
    means for updating the set of content records on the content server using the received new content records; and
    means for requesting content for distribution to users based on the content records.

44. The apparatus of claim 43, wherein said content index comprises at least one of a content-index time stamp, a presentation reference, or a program reference.

45. The apparatus of claim 44, wherein said presentation reference comprises at least one of a presentation time stamp or a presentation location.

46. The apparatus of claim 44, wherein said program reference comprises at least one of a program time stamp or a program location.

47. The apparatus of claim 43, wherein said content record comprises a presentation record.

48. The apparatus of claim 47, wherein said presentation record comprises at least one of content-provider program ID or presentation location.

49. The apparatus of claim 47, wherein said means for requesting content for distribution to users based on the content records further comprises:
    means for requesting at least one presentation from the content provider; and
    means for receiving the requested presentation on the content server.

50. The apparatus of claim 47, wherein said presentation record comprises a program record.

51. The apparatus of claim 50, wherein said program record comprises at least one of program rating, program duration, or program content information.

52. The apparatus of claim 51, wherein said program rating comprises at least one of MPAA rating or TV rating.

53. The apparatus of claim 51, wherein said program content information comprises at least one of program content encoding information or program content location information.

54. The apparatus of claim 50, further comprising:
    means for requesting, from the content provider, at least one program identified in a stored program record; and
    means for receiving the requested program from the content provider.

55. The apparatus of claim 43, wherein said means for requesting the content index from the content provider is triggered by a polling interval.

56. The apparatus of claim 43, wherein said means for requesting the content index from the content provider is based on need as determined by the content server or another entity.

57. A non-transitory computer-readable storage medium having stored thereon processor-executable instructions configured to cause a processor to perform operations comprising:
    storing, on a content server, a set of content records, each content record describing a piece of content and collectively describing the content available from a content provider;
    requesting a content index from a content provider;
    receiving the requested content index on the content server;
    using the requested content index to identify new content records;

requesting the identified new content records, which were identified using the requested content index, from the content provider;
receiving the identified new content records from the content provider;
updating the set of content records on the content server using the received new content records; and
requesting content for distribution to users based on the content records.

58. The non-transitory computer-readable storage medium of claim 57, wherein said content index comprises at least one of a content-index time stamp, a presentation reference, or a program reference.

59. The non-transitory computer-readable storage medium of claim 58, wherein said presentation reference comprises at least one of a presentation time stamp or a presentation location.

60. The non-transitory computer-readable storage medium of claim 58, wherein said program reference comprises at least one of a program time stamp or a program location.

61. The non-transitory computer-readable storage medium of claim 57, wherein said content record comprises a presentation record.

62. The non-transitory computer-readable storage medium of claim 61, wherein said presentation record comprises at least one of content-provider program ID or presentation location.

63. The non-transitory computer-readable storage medium of claim 61, wherein said requesting content for distribution to users based on the content records further comprises:
requesting at least one presentation from the content provider; and receiving the requested presentation on the content server.

64. The non-transitory computer-readable storage medium of claim 61, wherein said presentation record comprises a program record.

65. The non-transitory computer-readable storage medium of claim 64, wherein said program record comprises at least one of program rating, program duration, or program content information.

66. The non-transitory computer-readable storage medium of claim 65, wherein said program rating comprises at least one of MPAA rating or TV rating.

67. The non-transitory computer-readable storage medium of claim 65, wherein said program content information comprises at least one of program content encoding information or program content location information.

68. The non-transitory computer-readable storage medium of claim 64, the instructions further comprising:
requesting, from the content provider, at least one program identified in a stored program record; and
receiving the requested program from the content provider.

69. The non-transitory computer-readable storage medium of claim 57, wherein requesting the content index from the content provider is triggered by a polling interval.

70. The non-transitory computer-readable storage medium of claim 57, wherein requesting the content index from the content provider is based on need as determined by the content server or another entity.

71. An apparatus for maintaining content records on a content server, comprising:
logic for storing, on the content server, a set of content records, each content record describing a piece of content and collectively describing the content available from a content provider;
logic for requesting a content index from a content provider;
logic for receiving the requested content index on the content server;
logic for using the requested content index to identify new content records;
logic for requesting the identified new content records, which were identified using the requested content index, from the content provider;
logic for receiving the identified new content records from the content provider;
logic for updating the set of content records on the content server using the received new content records; and
logic for requesting content for distribution to users based on the content records.

72. The apparatus of claim 71, wherein said content index comprises at least one of a content-index time stamp, a presentation reference, or a program reference.

73. The apparatus of claim 72, wherein said presentation reference comprises at least one of a presentation time stamp or a presentation location.

74. The apparatus of claim 72, wherein said program reference comprises at least one of a program time stamp or a program location.

75. The apparatus of claim 71, wherein said content record comprises a presentation record.

76. The apparatus of claim 75, wherein said presentation record comprises at least one of content-provider program ID or presentation location.

77. The apparatus of claim 75, wherein said logic for requesting content comprises:
logic for requesting at least one presentation from the content provider; and
logic for receiving the requested presentation on the content server.

78. The apparatus of claim 75, wherein said presentation record comprises a program record.

79. The apparatus of claim 78, wherein said program record comprises at least one of program rating, program duration, or program content information.

80. The apparatus of claim 79, wherein said program rating comprises at least one of MPAA rating or TV rating.

81. The apparatus of claim 79, wherein said program content information comprises at least one of program content encoding information or program content location information.

82. The apparatus of claim 78, further comprising:
logic for requesting, from the content provider, at least one program identified in a stored program record; and
logic for receiving the requested program from the content provider.

83. The apparatus of claim 71, wherein said logic for requesting the content index from the content provider is triggered by a polling interval.

84. The apparatus of claim 71, wherein said logic for requesting the content index from the content provider is based on need as determined by the content server or another entity.

85. A device, comprising:
a network interface; and
a processor coupled to the network interface and configured with processor-executable instructions to perform operations comprising:
storing a set of program-guide records on a content server, each program-guide record describing a section of a program-guide and being collectively used to generate a program-guide;
requesting a program-guide index from a content provider;

receiving the requested program-guide index from the content provider;

using the requested program-guide index received from the content provider to identify new program-guide records;

requesting from the content provider new program-guide records identified using the requested program-guide index;

receiving the identified new program-guide records from the content provider; and updating the stored program-guide records on the content server using the received new program-guide records.

86. The device of claim 85, wherein the processor is configured with processor-executable instructions to perform operations such that the program-guide index comprises at least one of a program-guide-index time stamp or a program-guide reference.

87. The device of claim 86, wherein the processor is configured with processor-executable instructions to perform operations such that the program-guide reference comprises at least one of a content provider service ID, a program-guide time stamp, or a program-guide location.

88. The device of claim 85, wherein the processor is configured with processor-executable instructions to perform operations such that the program-guide record comprises at least one of a content-provider service ID, a program-guide start time, a program-guide end time, or a program-guide presentation.

89. The device of claim 88, wherein the processor is configured with processor-executable instructions to perform operations such that the program-guide presentation comprises at least one of presentation title, a presentation subtitle, a presentation description, a presentation genre, a presentation rating, a presentation rating modifier, a presentation start time, or a presentation duration.

90. The device of claim 85, wherein the processor is configured with processor-executable instructions to perform operations such that requesting the program-guide index from the content provider comprises requesting the program-guide index from the content provider triggered by a polling interval.

91. The device of claim 85, wherein the processor is configured with processor-executable instructions to perform operations such that requesting the program-guide index from the content provider comprises requesting the program-guide index from the content provider based on need as determined by the content server or another entity.

92. A device, comprising:
a network interface; and
a processor coupled to the network interface, the processor configured with processor-executable instructions to perform operations comprising:
storing, on a content server, a set of content records each describing a piece of content and collectively describing the content available from a content provider;
requesting a content index from a content provider;
receiving the requested content index on the content server;
using the requested content index to identify new content records;
requesting from the content provider new content records identified using the requested content index;
receiving the identified new content records from the content provider;
updating the set of content records on the content server using the received new content records; and
requesting content for distribution to users based on the content records.

93. The device of claim 92, wherein the processor is configured with processor-executable instructions to perform operations such that the content index comprises at least one of a content-index time stamp, a presentation reference, or a program reference.

94. The device of claim 93, wherein the processor is configured with processor-executable instructions to perform operations such that the presentation reference comprises at least one of a presentation time stamp or a presentation location.

95. The device of claim 93, wherein the processor is configured with processor-executable instructions to perform operations such that the program reference comprises at least one of a program time stamp or a program location.

96. The device of claim 92, wherein the processor is configured with processor-executable instructions to perform operations such that the content record comprises a presentation record.

97. The device of claim 96, wherein the processor is configured with processor-executable instructions to perform operations such that the presentation record comprises at least one of content-provider program ID or presentation location.

98. The device of claim 96, wherein the processor is configured with processor-executable instructions to perform operations such that requesting content for distribution to users based on the content records further comprises:
requesting at least one presentation from the content provider; and receiving the requested presentation on the content server.

99. The device of claim 96, wherein the processor is configured with processor-executable instructions to perform operations such that the presentation record comprises a program record.

100. The device of claim 99, wherein the processor is configured with processor-executable instructions to perform operations such that the program record comprises at least one of a program rating, program duration, or program content information.

101. The device of claim 100, wherein the processor is configured with processor-executable instructions to perform operations such that the program rating comprises at least one of a Motion Picture Association of America (MPAA) rating or TV rating.

102. The device of claim 100, wherein the processor is configured with processor-executable instructions to perform operations such that the program content information comprises at least one of program content encoding information or program content location information.

103. The device of claim 99, wherein the processor is configured with processor-executable instructions to perform operations further comprising:
requesting, from the content provider, at least one program identified in a stored program record; and
receiving the requested program from the content provider.

104. The device of claim 92, wherein the processor is configured with processor-executable instructions to perform operations such that requesting the content index from the content provider comprises requesting the content index from the content provide triggered by a polling interval.

105. The device of claim 92, wherein the processor is configured with processor-executable instructions to perform operations such that requesting the content index from the content provider comprises requesting the content index from the content provide based on need as determined by the content server or another entity.

* * * * *